United States Patent [19]
Barden et al.

[11] Patent Number: 6,079,316
[45] Date of Patent: Jun. 27, 2000

[54] INSULATING PRESS-TYPE COFFEE MAKER AND ACCESSORIES

[76] Inventors: Elliot Barden, P.O. Box 1665, Pacific Palisades, Calif. 90265; Sheila S. Turner, 850 Haverford Ave., Suite 12, Pacific Palisades, Calif. 90272

[21] Appl. No.: 09/268,569

[22] Filed: Mar. 15, 1999

[51] Int. Cl.⁷ .............................. A47J 31/38; B65D 25/34
[52] U.S. Cl. .............................. 99/297; 99/287; 150/901; 220/449
[58] Field of Search .............................. 99/279, 287, 290, 99/297; 206/545, 548; 150/901, 154; 200/449

[56] References Cited

U.S. PATENT DOCUMENTS

| | | | |
|---|---|---|---|
| 2,426,475 | 8/1947 | Van Frank | 150/901 |
| 5,183,183 | 2/1993 | Hernandez | 99/287 X |
| 5,570,623 | 11/1996 | Lin | 99/297 X |
| 5,609,265 | 3/1997 | Haberkorn et al. | 220/449 X |
| 5,809,867 | 9/1998 | Turner et al. | 99/297 |

*Primary Examiner*—Reginald L. Alexander
*Attorney, Agent, or Firm*—David A. Belasco; William H. Pavitt; Beehler & Pavitt

[57] ABSTRACT

The invention pertains to insulated coffee makers and insulating accessories for use with insulated and non-insulated coffee makers. A coffee press brews coffee from a fixture of ground coffee and boiling water placed in a heat resistant container. The mixture is allowed to brew for a specified period after which a plunger affixed to a filter screen is pushed downward in the container. This separates the coffee grounds from the brewed coffee. Coffee press coffee makers provide a superior flavor, however heat tends to dissipate rapidly from the container. The invention includes an insulated cylindrical brewing container. Another variant is an insulated insert fitted onto the coffee press lid. Still another is an insulating jacket extending from the top rim of the coffee press to its base with openings provided for the handle and the spout. The jacket may include an openable means to secure the jacket about the handle. The jacket could also include a hinged flap to seal the spout. Another variation on the invention is an insulated heat tube installed between the handle and frame assembly and the cylindrical brewing container. Another variant of the invention is an insulated handle and frame assembly. The insulated cylindrical brewing container, the insulated tube, and the insulated handle and frame assembly may each incorporate a temperature sensing film to allow continuous brew temperature monitoring. Another variant has an insulated lid. In a final variant, the insulated lid incorporates a hinged insulated flap to cover the spout opening.

9 Claims, 5 Drawing Sheets

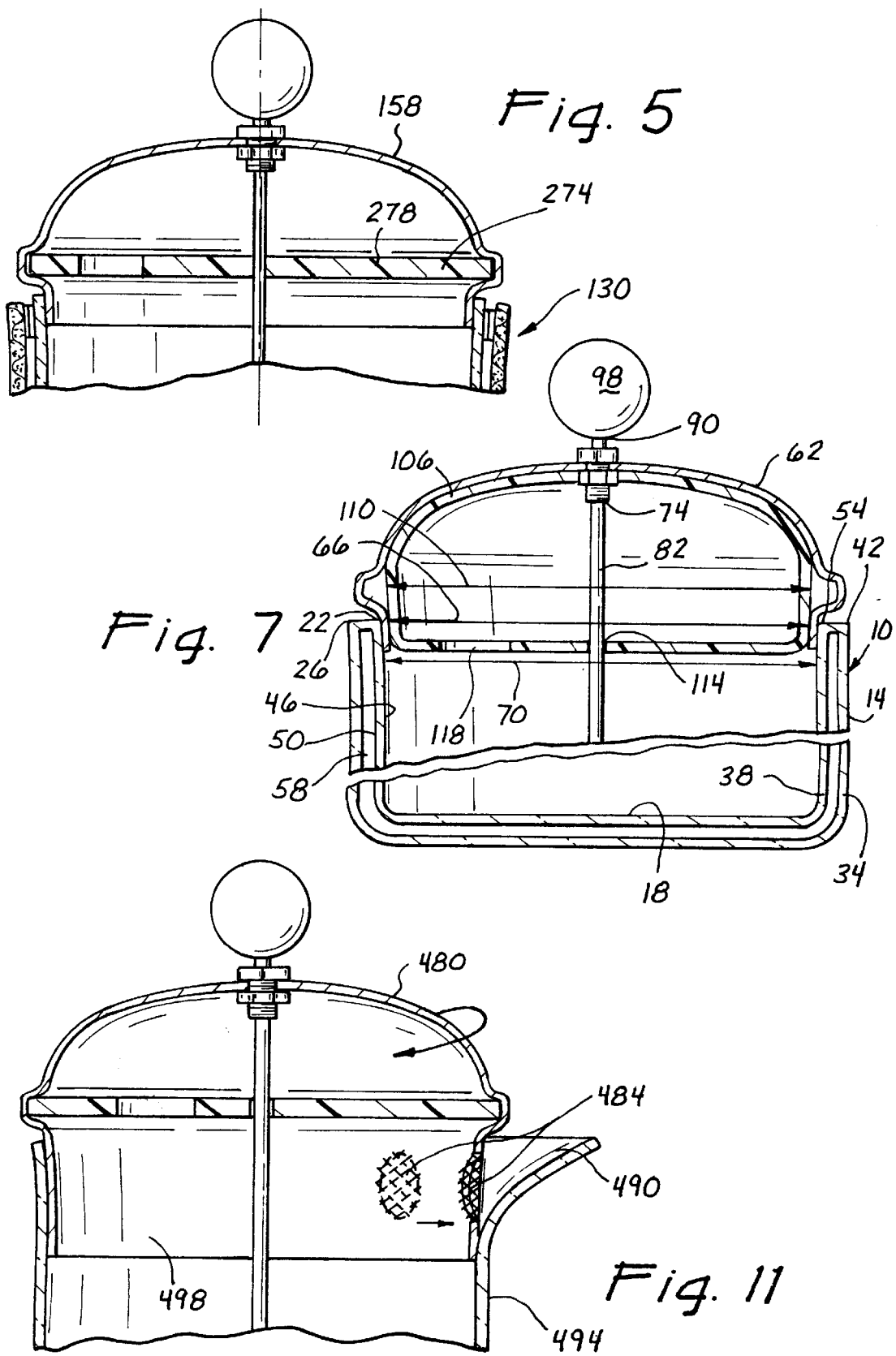

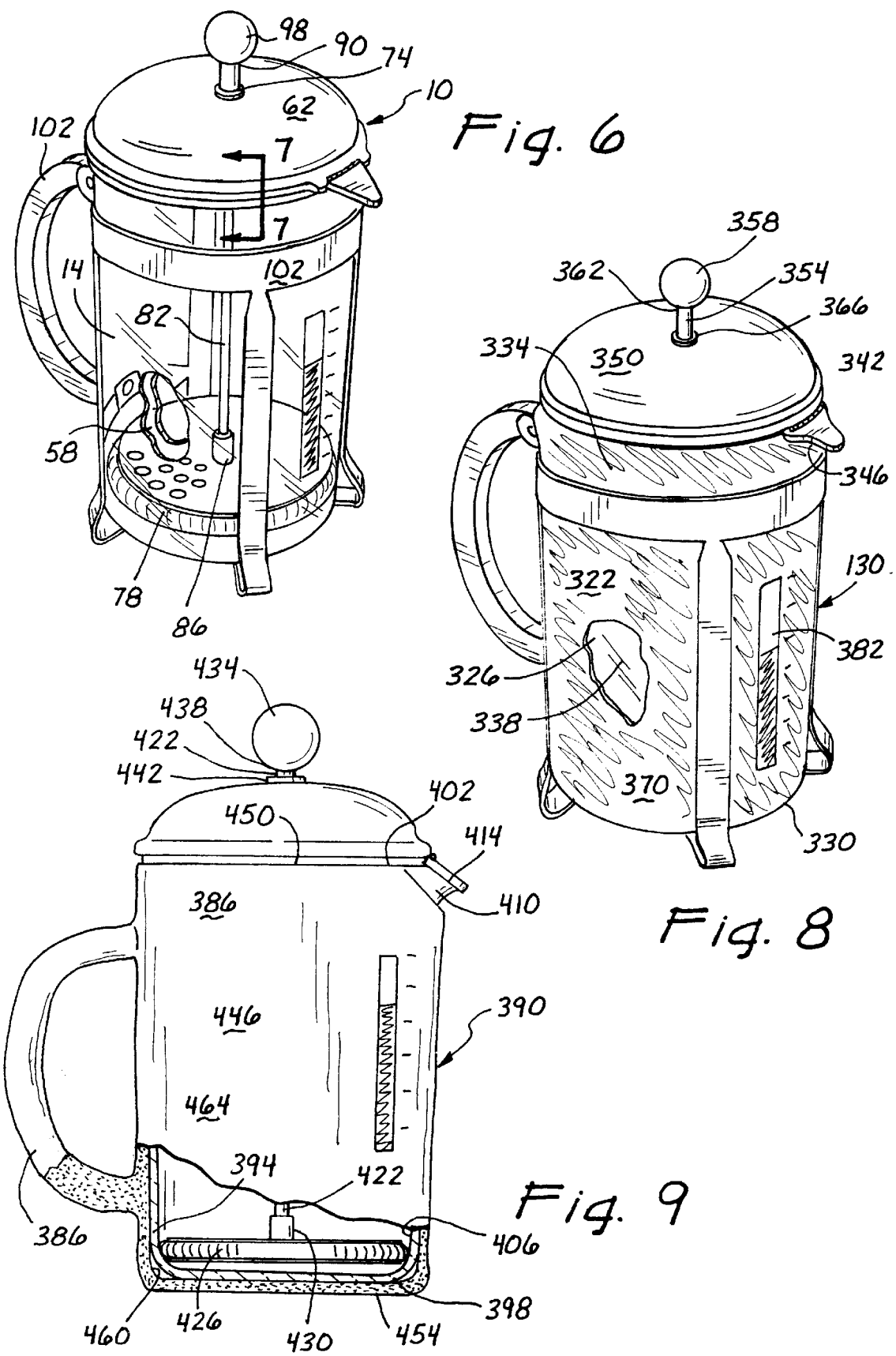

INSULATING PRESS-TYPE COFFEE MAKER AND ACCESSORIES

FIELD OF THE INVENTION

The invention pertains to insulated containers for beverages and more particularly to insulated coffee makers and insulating accessories for use with insulated and noninsulated coffee makers.

BACKGROUND OF THE INVENTION

The French Press or Coffee Press (referred hereinafter as a coffee press) has become a preferred way of brewing coffee among professional coffee tasters and the coffee drinking public in general. The coffee press is a relatively simple device comprising a pitcher (typically made of glass), a lid with a central hole, and a plunger fitted with a fine mesh screen or filter which is operated through the hole in the lid. In use, the ground coffee is placed in the pitcher and boiling water is added. The top is placed on the pitcher with the plunger withdrawn so that the filter is above the grounds and the water, allowing the coffee to brew. After about five minutes, the plunger is pushed down towards the bottom of the pitcher, so that the coffee grounds are separated from the liquid. While the coffee press has the ability to make superior coffee, it has the drawback of allowing the coffee to cool rapidly, thus losing the desired taste and temperature.

The prior art includes a number of inventions directed towards insulating beverage and other liquid containers. U.S. Pat. No. 1,116,932 issued to Schwartz et al. in 1914 provided for an insulating cover for a hot water bottle, the cover serving both to protect the user from burns and to retain the heat within the bottle. U.S. Pat. No. 1,346,485 issued to Arrigunaga in 1920 describes a device for the preparation of coffee or like beverages incorporating an insulated container with removable insulated cover. The cover of the device includes a plunger device with a screen at the lower end to separate coffee grounds or tea leaves from the brewing liquid. This device is designed to brew a single glass or serving of coffee or similar beverage with the beverage being drunk from the container directly.

U.S. Pat. No. 2,154,772 issued to Rathemacher in 1937 illustrates a bottle holder and protector for maintaining a wine bottle in a chilled condition. The invention is basically an insulating cloth that wraps around the bottle with the neck projecting through a hole in the cloth. U.S. Pat. No. 2,482,322 issued to Cortese in 1947 describes an insulating jacket for a baby bottle that zips or snaps over the feeding bottle. Likewise, U.S. Pat. No. 2,522,381 issued to Kramer in 1948 illustrates a baby bottle-insulating bag with a drawstring enclosure.

Of a slightly different nature, U.S. Pat. No. 2,740,544 issued to Vaughan in 1950 relates to a protective cover designed to minimized breakage of glass coffee pots typically used with commercial drip type coffee makers. U.S. Pat. No. 4,197,890 issued to Simko in 1980 describes an insulating jacket for bottles that has a bottom zipper enclosure. Finally, U.S. Pat. No. 5,415,305 issued to Drake-Tipton et al. in 1995 illustrates an insulating sleeve for a beverage pitcher.

U.S. Pat. No. 5,809,867 issued to the present inventors in Sep. 1998, describes an insulating jacket for a press-type coffee maker incorporating a magnetically sealed spout cover and hinged bottom cover.

It is an objective of this invention to provide a means for maintaining beverages brewed in a coffee press at a desirable drinking temperature. It is a further objective of the invention to provide a coffee press that can be easily used and easily cleaned. It is yet a further objective of the invention to provide a means for insulating the lid and spout of the coffee press. It is a still further objective of the invention to provide a means to determine the level of beverage remaining within the coffee press. It is yet a further objective of the invention to provide a means of determining the temperature or relative temperature of the coffee within the coffee press. It is still another objective of the invention to provide accessories for maintaining the temperature of coffee brewed in non-insulated coffee presses.

While many of the desired features of an insulated coffee press or insulating accessories for a press-type coffee maker may be found in the prior art, no invention previously known incorporates all of the desired features in an insulated coffee press or related accessories which is easy and inexpensive to manufacture and effective and simple to use.

SUMMARY OF THE INVENTION

The invention is an insulated press-type coffee maker (coffee press) and accessories. An insulated coffee press may be constructed from the following components. An insulated cylindrical brewing container, formed of heat resistant material is provided. The insulated cylindrical brewing container has a closed bottom, an open top, a top edge and an integral spout formed at the top edge. The insulated cylindrical brewing container includes an outer, closed bottom cylinder and a smaller inner closed bottom cylinder. The outer cylinder has a first upper edge and the smaller inner cylinder has an inner surface, an outer surface and a second upper edge. The inner cylinder is located within the outer cylinder.

The first upper edge of the outer cylinder is sealably joined to the upper edge of the inner cylinder to form the top edge of the cylindrical brewing container, thereby forming an enclosed and sealed space between the outer and inner cylinders.

A cylindrical lid is provided. The lid has an inner diameter and an outer diameter and is sized and shaped to removably attach to the inner surface of the inner cylinder at the top edge of the container. The cylindrical lid includes a centrally located circular orifice.

A circular fine mesh screen is provided. The screen is sized and shaped to fit slidably within the inner cylinder. A plunger rod is provided. The plunger rod has a first end and a second end and is removably attached at its first end to the center of the screen. The rod is sized and shaped to fit slidably through the orifice in the lid.

A plunger handle is affixed to the second end of the plunger rod and a handle and frame assembly is attached to the cylindrical brewing container.

In a variation on the insulated coffee press, the enclosed and sealed space between the inner cylinder and the outer cylinder of the insulated container is evacuated to form a vacuum within the space.

In another variant of the present invention, an insulated coffee press further includes an insulating lid insert. The insulating lid insert is sized and shaped to fit within the lid and has an outer diameter slightly smaller than the inner diameter of the lid. The insulating lid insert has a central orifice sized and located to permit the plunger rod to pass through it. A means for removing or inserting the insulating lid insert into thee lid is provided.

Yet another variant on the insulated coffee press includes a temperature sensing means that displays a visible change in response to a temperature change. The sensing means is affixed to the outer surface of the inner cylinder so as to be visible from the outside of the cylindrical container.

In yet a further variant of the invention, an insulating jacket for a coffee press is provided. The coffee press includes a heat resistant cylindrical brewing container with a cylindrical inner surface, a closed base, a spout with an upper edge. The coffee press further includes a handle and frame assembly, a lid fitting the cylindrical brewing container and a plunger having a fine mesh screen at the bottom end and a handle at the top end. The plunger rod passes through an orifice in the lid and the screen separates brewed coffee from coffee grounds at the base of the cylindrical brewing container.

The jacket includes a fitted sleeve formed of insulating material. The sleeve is shaped to conform roughly to the exterior shape of the cylindrical brewing container. The sleeve has an open top, a closed bottom, a top edge, an inner surface, an outer surface and openings to accommodate the handle and the spout of the cylindrical brewing container. The handle opening has a first side and a second side. A means for removably securing the sleeve to the cylindrical brewing container is provided.

In a still further variation, the means for removably securing the sleeve to the cylindrical brewing container includes a first flap. The first flap has a top surface and an under surface and is sized, shaped and located to extend from one side of the handle opening in the sleeve, through the handle and over the insulating material on the second side of the handle opening. There is a first hooking element attached to the under surface of the first flap and a first loop element attached to the outer surface of the sleeve adjacent to the second side of the handle opening. When the sleeve is positioned over the coffee press, and the first flap is passed through the handle, and the first hooking element is pressed onto the first looping element, the sleeve will be removably secured to the cylindrical brewing container. When the first hooking element is removed from the first looping element and the first flap lifted, the user may determine the level of coffee remaining in the coffee press.

In yet another variant of the invention, the means for removably securing the sleeve to the cylindrical brewing container further includes a second flap. The second flap has a top surface and a under surface and is sized, and shaped to extend from a first side of the sleeve above the handle opening and over the insulating material to a second side of the sleeve above the handle opening. A second hooking element is attached to the under surface of the second flap and a second loop element is attached to the outer surface of the sleeve adjacent to the second handle opening.

In use, the sleeve is positioned over the coffee press and the first flap is passed through the handle. The first hooking element is then pressed onto the first loop element, and the second hooking element is pressed onto the second loop element. The second flap will then be removably secured to the sleeve and the sleeve will be removably secured to the cylindrical brewing container.

In a further variant of the invention, an insulating lid insert for a coffee press is provided. The lid insert includes a cylindrical element formed of an insulating material. The element is sized and shaped to fit frictionally within a lid of a coffee press.

Yet a further variant of the coffee press invention includes a means for removably covering the spout of the cylindrical brewing container.

In still a further variant, the means for removably covering the spout of the cylindrical brewing container includes a flap shaped to cover the spout of the cylindrical brewing container. The flap is hingedly attached to the top edge of the sleeve at either side of the spout opening. The flap has a top surface and a bottom surface. The bottom surface is located upon an upper edge of the spout. The bottom surface of the flap is formed of a non-porous, heat resistant material.

When the coffee press is positioned vertically on its base, the flap rests upon the upper edge of the spout, thereby closing the spout and preserving heat within the coffee press. When the coffee press is tilted to pour coffee from the cylindrical brewing container, the flap will be displaced upwardly away from the spout by the weight of the coffee leaving the cylindrical brewing container.

In another variant of the invention, the means for removably covering the spout of the coffee press includes the top surface of the flap being formed of insulating material.

In still another variant, the means for removably covering the spout of a coffee press further includes a strip of magnetized material affixed to the sleeve adjacent to the upper edge of the spout. The bottom surface of the flap includes material that is attracted by a magnet.

When the coffee press is positioned vertically on its base, the flap rests upon the upper edge of the spout. The flap is held in place by magnetic attraction. This closes the spout and preserves heat within the coffee press. When the coffee press is tilted to pour coffee from the cylindrical brewing container, the flap is displaced upwardly away from the spout by the weight of coffee leaving the container with sufficient force to separate the flap from the upper edge of the spout despite the magnetic force attracting the flap to the magnetic strip.

In yet another variant of the invention, the insulating jacket for a coffee press further includes a heat-reflecting metallic inner surface for maximizing heat retention.

In still another variant the insulating jacket for a coffee press further includes a stain-resistant coating for the outer surface of the sleeve.

In a further variant of the invention, an insulating tube for a coffee press is provided. The coffee press includes a heat resistant cylinder. The cylinder has a closed bottom, an open top, a cylindrical outer surface and a spout. A handle and frame assembly sized to frictionally retain the cylinder is provided, as are a lid fitting the cylinder, a plunger having a fine mesh screen at the bottom end and a handle at the top end. The plunger rod passes through an orifice in the lid and operates to separate brewed coffee from coffee grounds at the bottom of the cylindrical brewing container.

The insulating tube includes a cylinder of heat-reflecting material that has an open top and a closed bottom. The heat-reflecting cylinder is sized and shaped to surround the heat resistant cylinder and to fit slidably between the cylinder and the handle and frame assembly of the coffee press. When the tube is installed between the handle and frame assembly and the cylinder, coffee brewed in the coffee press will better retain its heat due to the heat-reflecting qualities of the tube.

In still a further variant, the insulating tube for a coffee press further includes a temperature sensing means. The means displays a visible change in reaction to a temperature change and is incorporated into the heat-reflecting material of the tube so as to be in contact with the cylindrical brewing container and visible from the outside of the coffee press.

In still another variant of the invention, an insulated handle and frame assembly for a coffee press is provided. The coffee press includes a heat resistant cylinder with a closed bottom, an open top, a cylindrical inner surface, and a spout that includes an upper edge. The coffee press also includes a lid fitting the heat resistant cylinder, a plunger rod having a fine mesh screen at the bottom end and a handle at the top end. The plunger rod passes through an orifice in the lid and operates to separate brewed coffee from coffee grounds at the bottom of the heat resistant cylinder. The insulated handle and frame assembly includes a cylinder of heat reflecting material having an open top and a closed bottom, an inner surface and an outer surface. The assembly is sized and shaped to surround the heat resistant cylinder.

When the cylindrical brewing container is installed within the insulated handle and frame assembly, coffee brewed in the coffee press will better retain its heat due to the insulating qualities of the handle and frame assembly.

A variant of the insulated handle and frame assembly further a temperature sensing means. The temperature sensing means displays a visible change in reaction to a temperature change. The temperature sensing means is incorporated into the heat-reflecting material of the insulated handle and frame assembly so that it is in contact with the cylindrical brewing container and visible from outside of the coffee press.

In still another variant on the insulated coffee press invention, an insulated lid is provided. The lid includes heat-reflecting material. The material is sized and shaped to fit frictionally within the lid thereby retaining heat within the coffee press In yet another variant of the invention, the insulated lid includes a means for opening and closing access to the spout of the cylindrical brewing container.

In still a further variant, the means for opening and closing access to the spout of the cylindrical brewing container further includes a projecting lip extending downward from the lid. The lid is rotatable to a first position and a second position. When the lid is rotated to the first position, the projecting lip allows access to the spout from the cylindrical brewing container. When the lid is rotated to the second position, the projecting lip does not allow access to the spout from the cylindrical brewing container.

DESCRIPTION OF THE DRAWINGS

FIG. 5 is a cross sectional view of an insulating lid insert for a press-type coffee maker;

FIG. 6 is a partial cut-away perspective view of an insulated press-type coffee maker incorporating a temperature sensing strip and insulating lid insert;

FIG. 7 is a partial cut-away cross sectional view of the FIG. 6 embodiment, taken along the line 7—7, illustrating a second embodiment of an insulating lid insert;

FIG. 8 is a partial cut-away perspective view of a press-type coffee maker illustrating an attached insulating tube fitted between the heat resistant cylinder and the frame incorporating a temperature sensing strip;

FIG. 9 is a partial cut-away side elevational view of a press-type coffee maker incorporating an insulated handle and frame assembly;

FIG. 11 is a cross-sectional side elevational view of an insulating lid for a press-type coffee maker incorporating a means for opening and closing a passage way to the coffee pot spout.

DETAILED DESCRIPTION OF THE PREFERRED EMBODIMENT

Figure 1:
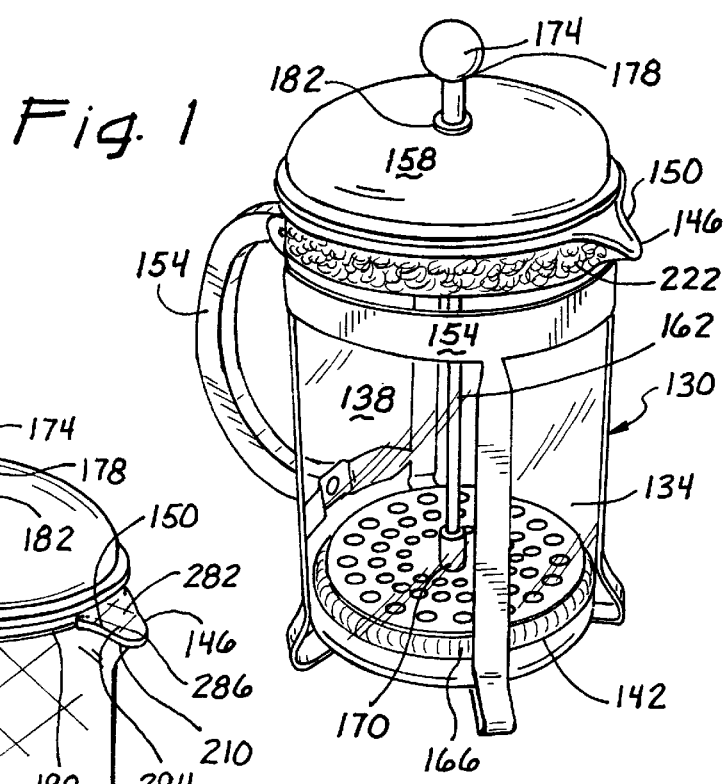
FIG. 1 is a perspective view of a press-type coffee maker illustrating a means for attaching an insulating jacket thereto.

The invention is an insulated press-type coffee maker (coffee press) 10 and accessories. As illustrated in FIGS. 6 and 7, an insulated coffee press 10 may be constructed from the following components. An insulated cylindrical brewing container 14, formed of heat resistant material is provided. The insulated cylindrical brewing container 14 has a closed bottom 18, an open top 22, a top edge 26 and an integral spout 30 formed at the top edge 26. The insulated cylindrical brewing container 14 includes an outer, closed bottom cylinder 34 and a smaller inner closed bottom cylinder 38. The outer cylinder has a first upper edge 42 and the smaller inner cylinder has an inner surface 46, an outer surface 50 and a second upper edge 54. The inner cylinder 38 is located within the outer cylinder 34.

The first upper edge 42 of the outer cylinder 34 is sealably joined to the upper edge 54 of the inner cylinder 38 to form the top edge 26 of the cylindrical brewing container 14, thereby forming an enclosed and sealed space 58 between the outer 34 and inner 38 cylinders.

A cylindrical lid 62 is provided. The lid 62 has an inner diameter 66 and an outer diameter 70 and is sized and shaped to removably attach to the inner surface 46 of the inner cylinder 38 at the top edge 26 of the container 14. The cylindrical lid 62 includes a centrally located circular orifice 74.

A circular fine mesh screen 78 is provided. The screen 78 is sized and shaped to fit slidably within the inner cylinder 38. A plunger rod 82 is provided. The plunger rod 82 has a first end 86 and a second end 90 and is removably attached at its first end 86 to the center 94 of the screen 78. The rod 82 is sized and shaped to fit slidably through the orifice 74 in the lid 62.

A plunger handle 98 is affixed to the second end 90 of the plunger rod 82 and a handle and frame assembly 102 is attached to the cylindrical brewing container 14.

In a variation on the insulated coffee press 10, the enclosed and sealed space 58 between the inner cylinder 38 and the outer cylinder 34 of the insulated container 14 is evacuated to form a vacuum within the space 58.

In another variant of the present invention, an insulated coffee press further includes an insulating lid insert 106, as illustrated in FIG. 7. The insulating lid insert 106 is sized and shaped to fit within the lid 62 and has an outer diameter 110 slightly smaller than the inner diameter 66 of the lid 62. The insulating lid insert 106 has a central orifice 114 sized and located to permit the plunger rod 82 to pass through it. A means 118 for removing or inserting the insulating lid insert 106 into the lid 62 is provided.

Yet another variant on the insulated coffee press 10, illustrated by FIG. 6, includes a temperature sensing means 122 that displays a visible change in response to a temperature change. The sensing means 122 is affixed to the outer surface 50 of the inner cylinder 38 so as to be visible from the outside of the cylindrical container 14.

In yet a further variant of the invention, illustrated in FIGS. 1, 2, 2a, 3, 3a and 4, an insulating jacket 126 for a coffee press 130 is provided. The coffee press 130 includes a heat resistant cylindrical brewing container 134 with a cylindrical inner surface 138, a closed base 142, a spout 146 with an upper edge 150. The coffee press 130 further includes a handle 154 and frame assembly 156, a lid 158 fitting the cylindrical brewing container 134 and a plunger rod 162 having a fine mesh screen 166 at the bottom end 170 and a handle 174 at the top end 178. The plunger rod 162 passes through an orifice 182 in the lid 158, and the screen 166 separates brewed coffee from coffee grounds at the base 142 of the cylindrical brewing container 134.

The jacket 126 includes a fitted sleeve 186 formed of insulating material 188. The sleeve 186 is shaped to conform roughly to the exterior shape of the cylindrical brewing container 134. The sleeve 186 has an open top 190, a closed bottom 194, a top edge 198, an inner surface 202, an outer surface 206 and openings 210 to accommodate the handle 154 and the spout 146 of the cylindrical brewing container 134. The handle opening 210 has a first side 214 and a second side 218. A means 222 for removably securing the sleeve 186 to the cylindrical brewing container 134 is provided.

In a still further variation, the means 222 for removably securing the sleeve 186 to the cylindrical brewing container 134 includes a first flap 226. The first flap 226 has a top surface 230 and an under surface 234 and is sized, shaped and located to extend from one side 214 of the handle opening 210 in the sleeve 186, through the handle 154 and over the insulating material 188 on the second side 218 of the handle opening 210. There is a first hooking element 238 attached to the under surface 234 of the first flap 226 and a first loop element 242 attached to the outer surface 206 of the sleeve 186 adjacent to the second side 218 of the handle opening 210.

When the sleeve 186 is positioned over the coffee press 130, and the first flap 226 is passed through the handle 154, and the first hooking element 238 is pressed onto the first looping element 242, the sleeve 186 will be removably secured to the cylindrical brewing container 134. When the first hooking element 238 is removed from the first looping element 242 and the first flap 226 lifted, the user may determine the level of coffee remaining in the coffee press 130.

Figure 4:
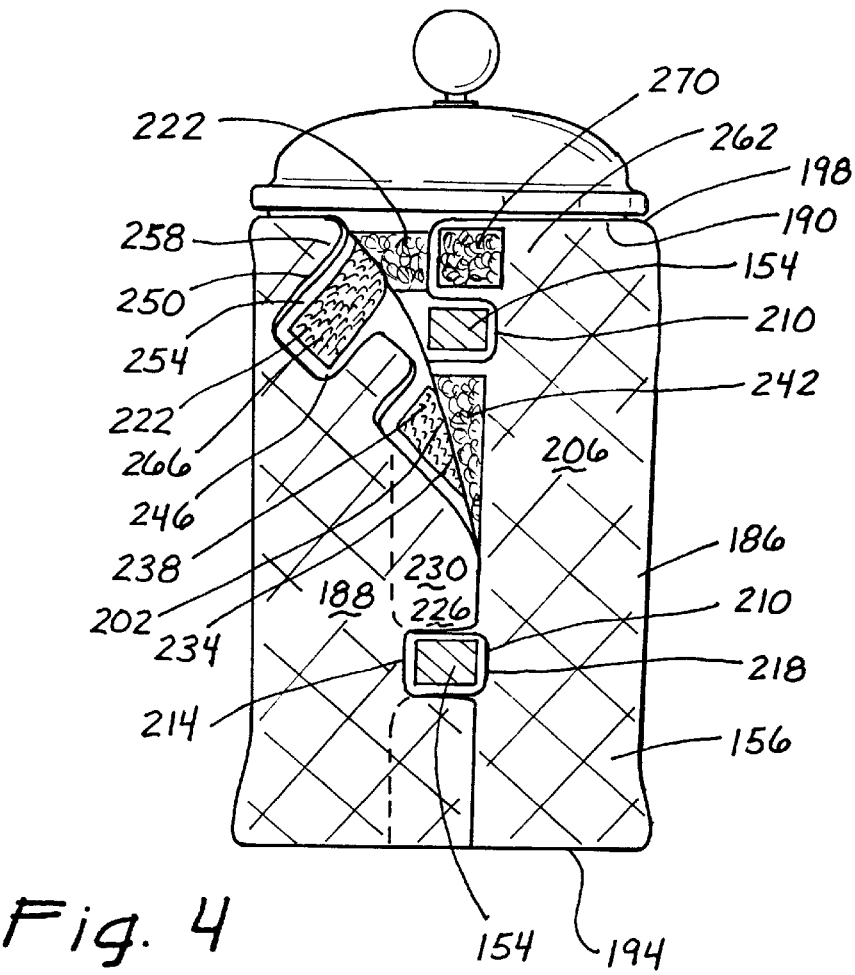
FIG. 4 is a side elevation of the closing means about the handle opening of the FIG. 2 embodiment.

In yet another variant of the invention, also illustrated by FIG. 4, the means 222 for removably securing the sleeve 186 to the cylindrical brewing container 134 further includes a second flap 246. The second flap 246 has a top surface 250 and a under surface 254 and is sized, and shaped to extend from a first side 258 of the sleeve 186 above the handle opening 210 and over the insulating material 188 to a second side 262 of the sleeve 186 above the handle opening 210. A second hooking element 266 is attached to the under surface 254 of the second flap 246 and a second loop element 270 is attached to the outer surface 206 of the sleeve 186 adjacent to the handle opening 210.

In use, the sleeve 186 is positioned over the coffee press 130 and the first flap 226 is passed through the handle 154. The first hooking element 238 is then pressed onto the first loop element 242, and the second hooking element 266 is pressed onto the second loop element 270. The second flap 246 will then be removably secured to the sleeve 186 and the sleeve 186 will be removably secured to the cylindrical brewing container 134.

In a further variant of the invention, illustrated in FIG. 5, an insulating lid insert 274 for a coffee press 130 is provided. The lid insert 274 includes a cylindrical element 278 formed of an insulating material. The element 278 is sized and shaped to fit frictionally within a lid 158 of a coffee press 130.

Figure 2:
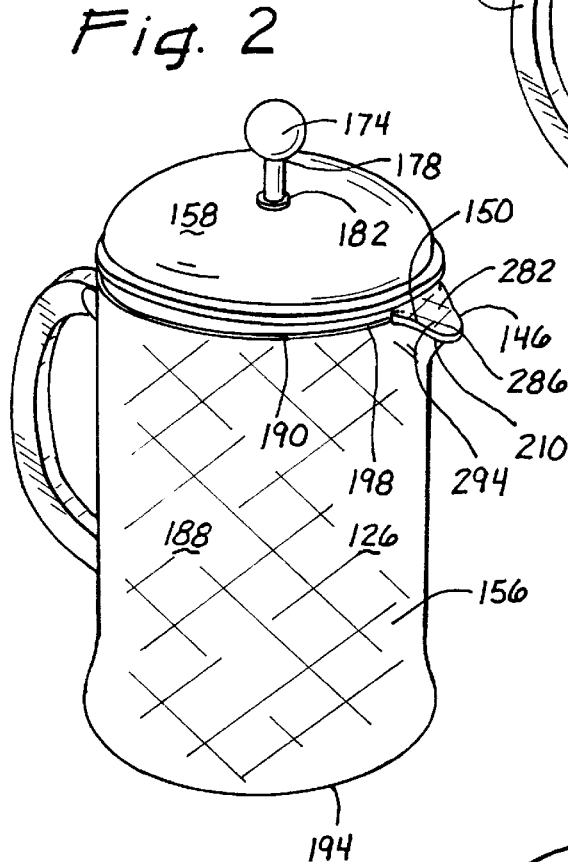
FIG. 2 is a perspective view of the preferred embodiment of the insulating jacket illustrating a hinged spout-covering flap attached to the jacket.
Figure 2A:
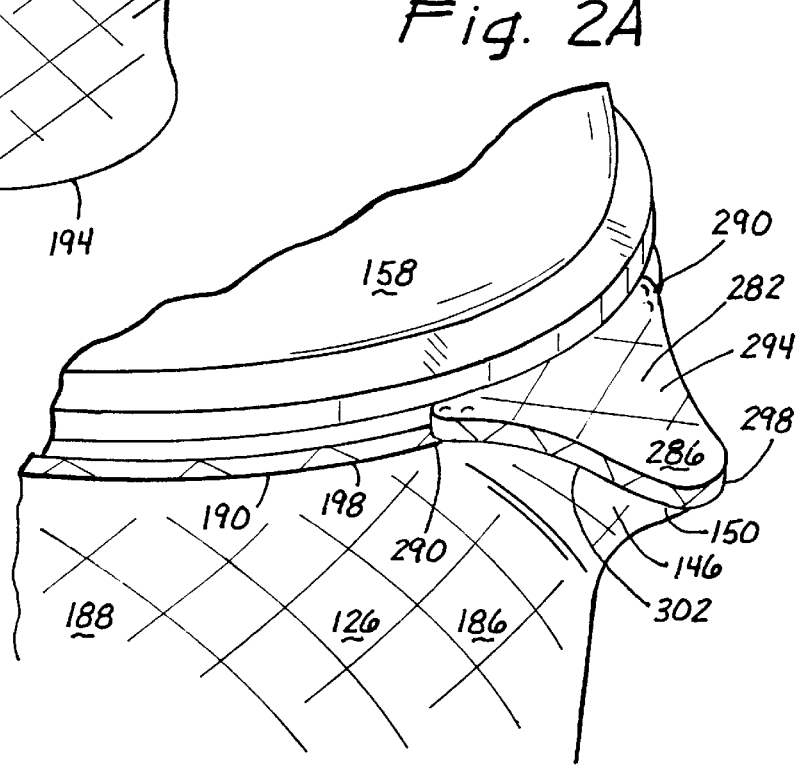
FIG. 2a is a detailed perspective view of the FIG. 1 embodiment illustrating the hinged attachment of the spout-covering flap.

Yet a further variant of the coffee press invention, as illustrated in FIGS. 2 and 2a, includes a means 282 for removably covering the spout 146 of the cylindrical brewing container 134.

In still a further variant, also illustrated in FIGS. 2 and 2a, the means 282 for removably covering the spout 146 of the cylindrical brewing container 134 includes a flap 286 shaped to cover the spout 146 of the cylindrical brewing container 134. The flap 286 is hingedly attached to the top edge 198 of the sleeve 186 at either side 290 of the spout 146. The flap 286 has a top surface 294 and a bottom surface 298. The bottom surface 298 is located upon an upper edge 302 of the spout 146. The bottom surface 298 of the flap 286 is formed of a non-porous, heat resistant material.

When the coffee press 130 is positioned vertically on its base 142, the flap 286 rests upon the upper edge 302 of the spout 146, thereby closing the spout 146 and preserving heat within the coffee press 130. When the coffee press 130 is tilted to pour coffee from the cylindrical brewing container 134, the flap 286 will be displaced upwardly away from the spout 146 by the weight of the coffee leaving the cylindrical brewing container 134.

In another variant of the invention, also illustrated in FIGS. 2 and 2a, the means 282 for removably covering the spout 146 of the coffee press 130 includes the top surface 294 of the flap 286 being formed of insulating material.

Figure 3:
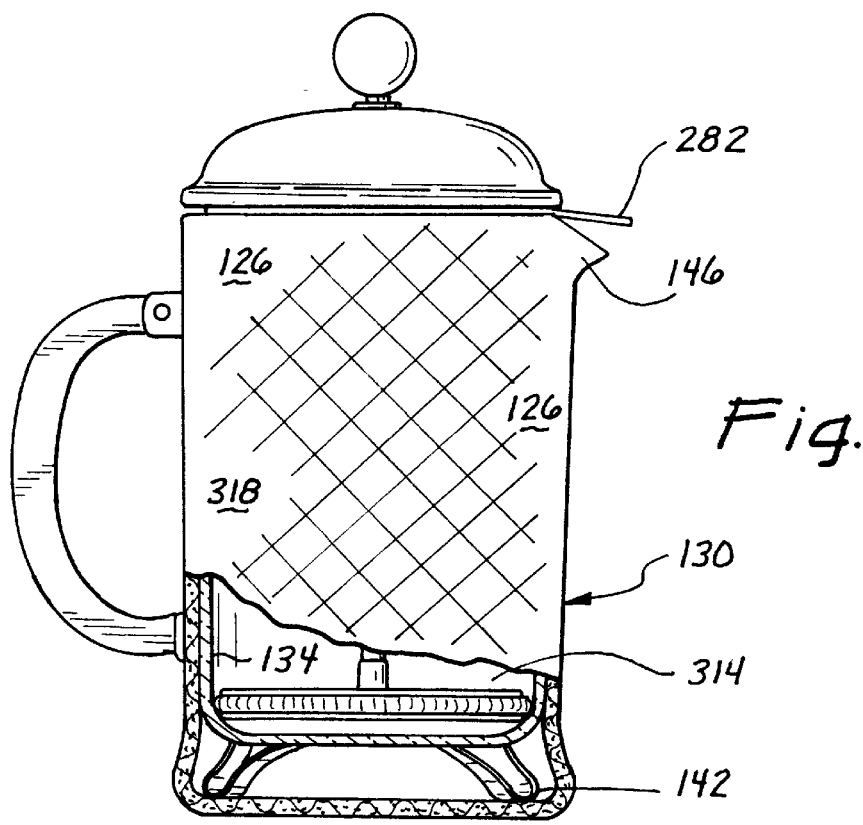
FIG. 3 is a cross sectional view of the coffee press and a partial cut-away view of the insulating jacket illustrating the hinged spout-covering flap.
Figure 3A:
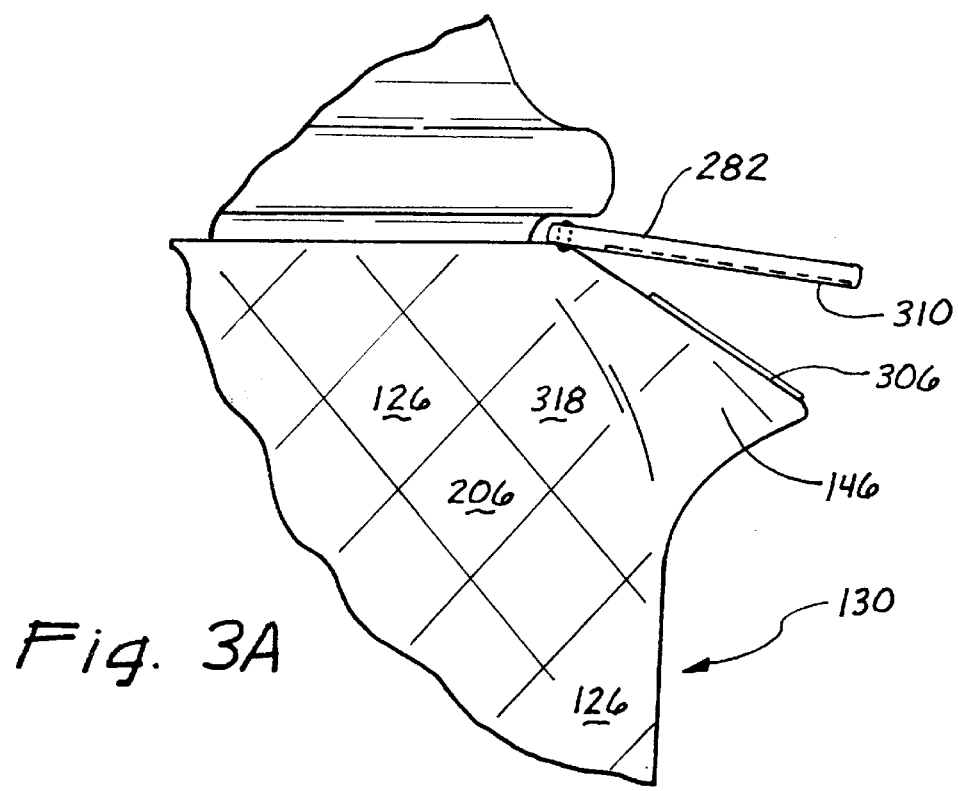
FIG. 3a is a side elevational detail of the FIG. 3 embodiment illustrating the hinged spout-covering flap with magnetic attachment means.

In still another variant, illustrated in FIGS. 3 and 3a, the means 282 for removably covering the spout 146 of a coffee press 130 further includes a strip of magnetized material 306 affixed to the sleeve 186 adjacent to the upper edge 302 of the spout 146. The bottom surface 298 of the flap 286 includes material 310 that is attracted by a magnet.

When the coffee press 130 is positioned vertically on its base 142, the flap 286 rests upon the upper edge 302 of the spout 146. The flap 286 is held in place by magnetic attraction. This closes the spout 146 and preserves heat within the coffee press 130. When the coffee press 130 is tilted to pour coffee from the cylindrical brewing container 134, the flap 286 is displaced upwardly away from the spout 146 by the weight of coffee leaving the container 134 with sufficient force to separate the flap 286 from the upper edge 302 of the spout 146 despite the magnetic force attracting the flap 286 to the magnetic strip 306.

In yet another variant of the invention, also illustrated by FIG. 3, the insulating jacket 126 for a coffee press 130 further includes a heat-reflecting metallic inner surface 314 for maximizing heat retention.

In still another variant, also illustrated by FIGS. 3 and 3a, the insulating jacket 126 for a coffee press 130 further includes a stain-resistant coating 318 for the outer surface 206 of the sleeve 186.

In a further variant of the invention, illustrated by FIG. 8, an insulating tube 322 for a coffee press 130 is provided. The coffee press 130 includes a heat resistant cylinder 326. The cylinder 326 has a closed bottom 330, an open top 334, a cylindrical outer surface 338 and a spout 342. A handle and frame assembly 346 sized to frictionally retain the cylinder 326 is provided, as are a lid 350 fitting the cylinder 326, a plunger rod 354 having a fine mesh screen (not shown) at the bottom end (not shown) and a handle 358 at the top end 362. The plunger rod 354 passes through an orifice 366 in the lid 350 and operates to separate brewed coffee from coffee grounds at the bottom 330 of the cylinder 326.

The insulating tube 322 includes a cylinder of heat-reflecting material 370 that has an open top 374 and a closed bottom 378. The heat-reflecting cylinder 370 is sized and is shaped to surround the heat resistant cylinder 326 and to fit slidably between the cylinder 326 and the handle and frame assembly 346 of the coffee press 130. When the tube 322 is installed between the handle and frame assembly 346 and the cylinder 326, coffee brewed in the coffee press 130 will better retain its heat due to the heat-reflecting qualities of the tube 322.

In still a further variant, also illustrated by FIG. 8, the insulating tube 322 for a coffee press 130 further includes a temperature sensing means 382. The means 382 displays a visible change in reaction to a temperature change and is incorporated into the heat-reflecting material 370 of the tube 322 so as to be in contact with the heat resistant cylinder 326 and visible from the outside of the coffee press 130.

In still another variant of the invention, illustrated by FIG. 9, an insulated handle and frame assembly 386 for a coffee press 390 is provided. The coffee press 390 includes a heat resistant cylinder 394 with a closed bottom 398, an open top 402, a cylindrical inner surface 406, and a spout 410 that includes an upper edge 414. The coffee press 390 also includes a lid 418 fitting the heat resistant cylinder 394, a plunger rod 422 having a fine mesh screen 426 at the bottom end 430 and a handle 434 at the top end 438. The plunger rod 422 passes through an orifice 442 in the lid 418 and operates to separate brewed coffee from coffee grounds at the bottom 398 of the heat resistant cylinder 394. The insulated handle and frame assembly 386 includes a cylinder of heat reflecting material 446 having an open top 450 and a closed bottom 454, an inner surface 460 and an outer surface 464. The assembly 386 is sized and shaped to surround the heat resistant cylinder 394.

When the heat resistant cylinder 394 is installed within the insulated handle and frame assembly 386, coffee brewed in the coffee press 390 will better retain its heat due to the insulating qualities of the handle and frame assembly 386.

A variant of the insulated handle and frame assembly, also illustrated by FIG. 9, further a temperature sensing means 468. The temperature sensing means 468 displays a visible change in reaction to a temperature change. The temperature sensing means 468 is incorporated into the heat-reflecting material 446 of the insulated handle and frame assembly 386 so that it is in contact with the heat resistant cylinder 394 and visible from outside of the coffee press 390.

Figure 10:
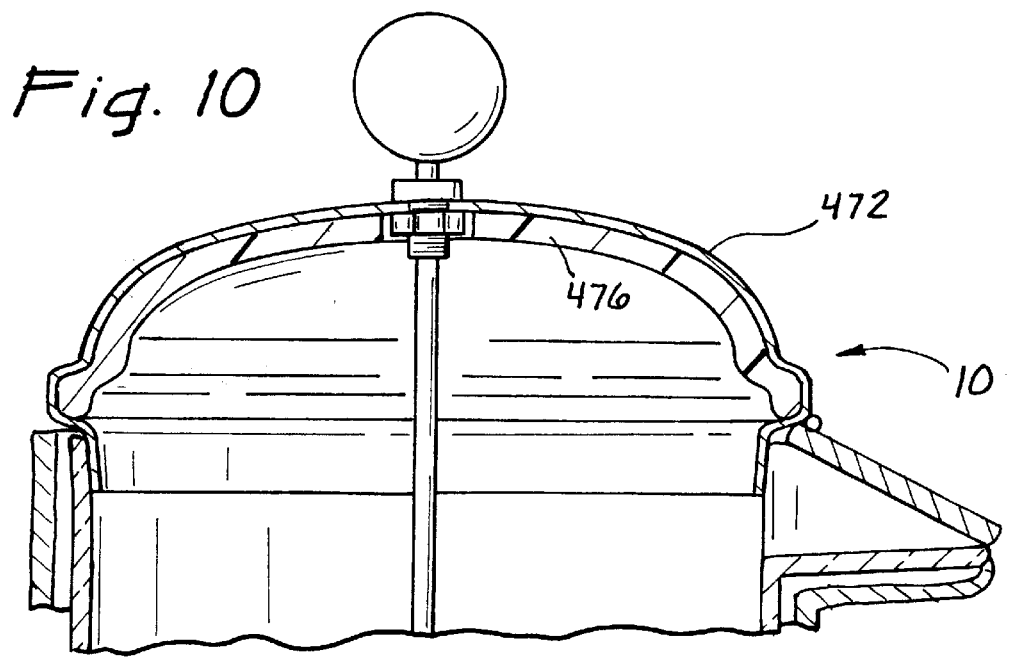
FIG. 10 is a cross-sectional side elevational view of an insulating lid for a press-type coffee maker.

In still another variant on the insulated coffee press invention, illustrated by FIG. 10, an insulated lid 472 is provided. The lid 472 includes heat-reflecting material 476. The material 476 is sized and shaped to fit frictionally within the lid 472 thereby retaining heat within the coffee press 10.

In yet another variant of the invention, illustrated by FIG. 11, the insulated lid 480 includes a means 484 for opening and closing access to the spout 490 of the cylindrical brewing container 494.

In still a further variant, also illustrated by FIG. 11, the means 484 for opening and closing access to the spout 490 of the cylindrical brewing container 494 further includes a projecting lip 498 extending downward from the lid 480.

The lid 480 is rotatable to a first position and a second position. When the lid 480 is rotated to the first position, the projecting lip 498 allows access to the spout 490 from the cylindrical brewing container 494. When the lid 480 is rotated to the second position, the projecting lip 498 does not allow access to the spout 480 from the cylindrical brewing container 494.

What is claimed is:

1. An insulating jacket for a coffee press, said coffee press comprising a heat resistant cylindrical brewing container having a cylindrical inner surface, a closed base, a spout with an upper edge, a handle and frame assembly, a lid fitting the cylindrical brewing container and a plunger rod having a fine mesh screen at the bottom end and a handle at the top end, the plunger rod passes through an orifice in the lid and the screen separates brewed coffee from coffee grounds at the base of the cylindrical brewing container, said jacket comprising:

a fitted sleeve formed of insulating material, said sleeve being shaped to conform roughly to the exterior shape of the cylindrical brewing container;

said sleeve having an open top, a closed bottom, a top edge, an inner surface, an outer surface and openings to accommodate the handle and the spout of the cylindrical brewing container cylindrical brewing container;

said handle opening having a first side and a second side; and a means for removably securing the sleeve to the cylindrical brewing container.

2. An insulating jacket for a coffee press, as described in claim 1 wherein the means for removably securing the sleeve to the cylindrical brewing container further comprises:

a first flap, said first flap having a top surface and an under surface and being sized, shaped and disposed to extend from one side of the handle opening in the sleeve, through the handle and over the insulating material on the second side of the handle opening;

a first hooking element fixedly attached to the under surface of said first flap;

a first loop element fixedly attached to the outer surface of the sleeve adjacent the second side of the handle opening;

whereby when the sleeve is positioned over the coffee press, and the first flap is passed through the handle, and the first hooking element is pressed onto the first loop element, the sleeve will be removably secured to the cylindrical brewing container; and whereby, when the first hooking element is removed from the first loop element and the first flap lifted, the user may determine the level of coffee remaining in the coffee press.

3. An insulating jacket for a coffee press, as described in claim 2 wherein the means for removably securing the sleeve to the cylindrical brewing container further comprises:

a second flap, said second flap having a top surface and an under surface and being sized, shaped and disposed to extend from a first side of the sleeve above the handle opening, to a second side of the sleeve above the handle opening;

a second hooking element fixedly attached to the under surface of said first flap;

a second loop element fixedly attached to the outer surface of the sleeve adjacent the second of the handle opening; and whereby, when the sleeve is positioned over the coffee press, and the first flap is passed through the handle, and the first hooking element is pressed onto the first loop element, and the second hooking element is pressed onto the second loop element the second flap will be removably secured to the sleeve and the sleeve will be removably secured to the cylindrical brewing container.

4. An insulating jacket for a coffee press, as described in claim 1 further comprising a means for removably covering the spout of the cylindrical brewing container.

5. An insulating jacket for a coffee press, as described in claim 4 wherein the means for removably covering the spout of the cylindrical brewing container further comprises:

a flap shaped to cover the spout of the cylindrical brewing container, said flap being hingedly attached to the top edge of the sleeve at either side of the spout opening;

said flap having a top surface and a bottom surface, said bottom surface disposed upon an upper edge of the spout;

said bottom surface being formed of a non-porous, heat resistant material; and wherein, when the coffee press is positioned vertically on its base the flap rests upon the upper edge of the spout, thereby closing the spout and preserving heat within the coffee press, and when the coffee press is tilted to pour coffee from the cylindrical brewing container, the flap will be displaced upwardly away from the spout by the weight of coffee leaving the cylindrical brewing container.

6. A means for removably covering the spout of the coffee press as described in claim 5 wherein the top surface of the flap is formed of insulating material.

7. A means for removably covering the spout of the coffee press as described in claim 5, further comprising:

a strip of magnetized material affixed to the sleeve adjacent the upper edge of the spout;

said bottom surface of the flap being formed of material attracted by a magnet; and wherein, when the coffee press is positioned vertically on its base the flap rests upon the upper edge of the spout, said flap being held in place by magnetic attraction, thereby closing the spout and preserving heat within the coffee press, and when the coffee press is tilted to pour a coffee from the cylindrical brewing container, the flap will be displaced upwardly away from the spout by the weight of coffee leaving the container with sufficient force to separate the flap from the top edge of the spout despite the magnetic force attracting the flap to the magnetic strip.

8. An insulating jacket for a coffee press as described in claim 1 further comprising a heat-reflecting metallic inner surface for maximizing heat retention.

9. An insulating jacket for a coffee press as described in claim 1 further comprising a stain-resistant coating for the outer surface of the sleeve.

* * * * *